(12) United States Patent
Hwang et al.

(10) Patent No.: US 11,025,290 B2
(45) Date of Patent: Jun. 1, 2021

(54) COMMUNICATION SIGNAL COMPENSATOR

(71) Applicant: LG ELECTRONICS INC., Seoul (KR)

(72) Inventors: Joosung Hwang, Seoul (KR); Jeongkyo Seo, Seoul (KR); Sewook Oh, Seoul (KR); Geunseok Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 253 days.

(21) Appl. No.: 16/312,984

(22) PCT Filed: Jun. 20, 2017

(86) PCT No.: PCT/KR2017/006447
§ 371 (c)(1),
(2) Date: Dec. 21, 2018

(87) PCT Pub. No.: WO2017/222269
PCT Pub. Date: Dec. 28, 2017

(65) Prior Publication Data
US 2019/0229765 A1    Jul. 25, 2019

Related U.S. Application Data

(60) Provisional application No. 62/354,105, filed on Jun. 23, 2016.

(51) Int. Cl.
*H04B 1/40*    (2015.01)
*H04B 1/401*   (2015.01)
(Continued)

(52) U.S. Cl.
CPC .............. *H04B 1/401* (2013.01); *H02J 7/025* (2013.01); *H02J 50/10* (2016.02); *H02J 50/80* (2016.02);
(Continued)

(58) Field of Classification Search
CPC .... H04B 1/401; H04B 1/3822; H04B 17/318; H04B 5/0037; H04B 5/0031; H02J 50/80;
(Continued)

(56) References Cited

U.S. PATENT DOCUMENTS 6,226,507 B1 * 5/2001 Ramesh ................. H04B 7/082
455/277.1
7,068,237 B2 * 6/2006 Fukuda .................... H01Q 3/24
343/793

(Continued)

FOREIGN PATENT DOCUMENTS

| EP | 1511119 | 3/2005 |
|----|---------|--------|
| EP | 2647329 | 10/2013 |

(Continued)

OTHER PUBLICATIONS

European Patent Office Application Serial No. 17815682.4, Search Report dated Mar. 11, 2020, 2 pages.

(Continued)

*Primary Examiner* — Jack Chiang
*Assistant Examiner* — Brandon Bowers
(74) *Attorney, Agent, or Firm* — Lee, Hong, Degerman, Kang & Waimey

(57) ABSTRACT

The present invention relates to a wireless charging device including a communication signal compensator, a communication signal compensator comprises a power detector configured to detect a magnitude of a communication signal received through each of the plurality of antennas, and a control unit configured to acquire a communication signal (Continued)

having the greatest signal magnitude as the detection result, select an antenna corresponding to the communication signal having the greatest signal magnitude among the plurality of antennas, and transmit, to the coupling antenna, a switch control signal for controlling the switch to be connected to the selected antenna.

7 Claims, 13 Drawing Sheets

(51) Int. Cl.
  *H04B 1/3822* (2015.01)
  *H04B 17/318* (2015.01)
  *H02J 50/10* (2016.01)
  *H02J 50/80* (2016.01)
  *H02J 7/02* (2016.01)
(52) U.S. Cl.
  CPC ......... *H04B 1/3822* (2013.01); *H04B 17/318* (2015.01)
(58) Field of Classification Search
  CPC .......... H02J 7/025; H02J 50/10; H01Q 3/247; H01Q 1/3275; H01Q 3/24; H01Q 21/28; H01Q 1/44
  USPC ......................................................... 320/108
  See application file for complete search history.

(56) References Cited

U.S. PATENT DOCUMENTS

| | | | |
|---|---|---|---|
| 9,705,339 B2* | 7/2017 | Tani | ........................ H02J 50/40 |
| 2010/0201312 A1 | 8/2010 | Kirby et al. | |
| 2013/0012774 A1* | 1/2013 | Koide | ................ A61B 1/00016 |
| | | | 600/109 |
| 2015/0118957 A1 | 4/2015 | Schaefer et al. | |

FOREIGN PATENT DOCUMENTS

| | | |
|---|---|---|
| EP | 2763236 | 8/2014 |
| JP | 4337457 | 9/2009 |
| KR | 1020010040593 | 5/2001 |
| KR | 1020090068023 | 6/2009 |
| KR | 1020100127596 | 12/2010 |
| KR | 1020110114703 | 10/2011 |
| KR | 1020140097849 | 8/2014 |
| KR | 1020150048002 | 5/2015 |

OTHER PUBLICATIONS

PCT International Application No. PCT/KR2017/006447, International Search Report dated Sep. 27, 2017, 7 pages.

* cited by examiner

Without Compensator     Base Station     With Compensator
<Coverage Situation>

COMMUNICATION SIGNAL COMPENSATOR

CROSS-REFERENCE TO RELATED APPLICATIONS

This application is the National Stage filing under 35 U.S.C. 371 of International Application No. PCT/KR2017/006447, filed on Jun. 20, 2017, which claims the benefit of U.S. Provisional Application No. 62/354,105, filed on Jun. 23, 2016, the contents of which are all hereby incorporated by reference herein in their entirety.

TECHNICAL FIELD

The present invention relates to a communication signal compensator and a wireless charging device including the communication signal compensator.

BACKGROUND ART

Recently, as the tall buildings are developing and the interior space become complicated, the shadow area with poor radio wave environment in a wireless communication system occurs in all over the building. In addition, since a vehicle, an elevator, and the like are generally made of metal, the transmission/reception rate of a radio wave is lowered when the radio wave must pass through the vehicle or the elevator.

As a technique for solving these problems, an antenna is installed outside a building or a vehicle, and the external antenna is connected to an internal antenna installed inside the building or the vehicle, thereby improving a radio wave environment in a shadow area.

However, even in the shadow area, a transmission/reception rate of a signal may be changed according to an installation position of an antenna, a position of a communication device transmitting and receiving a communication signal, and the like. Therefore, it may be required to develop a communication signal compensator capable of increasing a transmission/reception rate of a communication signal transmitted and received by a communication device, without regard to an installation position of an antenna and a position of a communication device.

DISCLOSURE OF THE INVENTION

Technical Problem

An aspect of the present invention is directed to provide a communication signal compensator for maximizing transmission and reception strength of a communication signal transmitted and received to and from a communication device, without regard to a position of the communication device, and a wireless charging device including the communication signal compensator.

Technical Solution

A communication signal compensator connected to a coupling antenna including a plurality of antennas and a switch connected to one of the plurality of antennas according to an embodiment of the present invention comprising a power detector configured to detect a magnitude of a communication signal received through each of the plurality of antennas, and a control unit configured to acquire a communication signal having the greatest signal magnitude as the detection result, select an antenna corresponding to the communication signal having the greatest signal magnitude among the plurality of antennas, and transmit, to the coupling antenna, a switch control signal for controlling the switch to be connected to the selected antenna.

A wireless charging device according to an embodiment of the present invention comprising a wireless charging unit configured to transmit wireless power to a communication device, a coupling antenna including a plurality of antennas configured to receive a communication signal generated from the communication device, and a switch connected to one of the plurality of antennas, and a communication signal compensator connected to the coupling antenna and configured to, when the communication signal received by each of the plurality of antennas is transmitted, control the switch to be connected to one of the plurality of antennas, based on the transmitted communication signal, and amplify the communication signal received through the connected antenna.

The communication signal compensator comprises a power detector configured to detect a magnitude of the communication signal received through each of the plurality of antennas, and a control unit configured to select an antenna corresponding to the communication signal having a greatest signal magnitude among the plurality of antennas, and control the switch to be connected to the selected antenna among the plurality of antennas The communication signal compensator comprises a detection unit comprising the power detection unit and a plurality of band pass filters, a band setting unit configured to analyze a power level, at which the communication signal received through the selected antenna passes through each of the plurality of band pass filters, and set a frequency band of the communication signal, and an output setting unit configured to set an output band so that the communication signal is outputted according to the set frequency band The communication signal compensator is configured to when an uplink signal is detected, control the switch to be sequentially connected to each of the plurality of switches.

A wireless charging device according to an embodiment of the present invention comprising a plurality of antennas configured to receive a communication signal generated from a communication device, a communication signal compensator configured to amplify a communication signal received through one of the plurality of antennas, a wireless charging coil configured to transmit wireless power to the communication device, and a switch connected to each of the plurality of antennas and configured to connect one of the plurality of antennas to the communication signal compensator, wherein the switch, a switch line, and the plurality of antennas are disposed on the same substrate.

The wireless charging coil is disposed between the plurality of antennas and the communication signal compensator.

The wireless charging device further comprising a switch control line configured to transmit a switch control signal for controlling the switch to be connected to one of the plurality of antennas.

The switch control line is connected between the switch and the communication signal compensator and passes between the substrate and the communication signal compensator.

A length of each of the plurality of switch lines is shorter than a length of the switch control line.

The wireless charging device further comprising a cover in which the communication device is capable of being disposed, wherein the substrate is disposed below the cover.

A wireless communication device according to an embodiment of the present invention comprising an upper substrate comprising a plurality of antennas configured to receive a communication signal generated from a communication device, a lower substrate comprising a communication signal compensator configured to amplify a communication signal received through one of the plurality of antennas, a wireless charging coil configured to transmit wireless power to the communication device, and a switch comprising a plurality of switch lines connected to each of the plurality of antennas and configured to connect one of the plurality of antennas to the communication signal compensator, wherein the switch is disposed on the lower substrate, and the plurality of switch lines are connected from the upper substrate to the lower substrate.

The wireless charging device further comprising a switch control line configured to transmit a switch control signal for controlling the switch to be connected to one of the plurality of antennas.

The switch control line is configured to connect the switch to the communication signal compensator and is disposed on the lower substrate.

A length of each of the plurality of switch lines is longer than a length of the switch control line.

Advantageous Effects

According to embodiments, not one antenna but a plurality of antennas are provided, and a communication signal may be received at the greatest magnitude by selecting an antenna having a greatest magnitude of a reception signal among the plurality of antennas According to embodiments, wireless power may be supplied to a communication device, and a communication signal may be received at the greatest magnitude and amplified.

According to embodiments, since a length of a plurality of switch lines connecting a plurality of antennas to a switch is minimized, the structure may be simplified, and the risk of tangling or breaking of at least one of the plurality of switch lines is reduced.

According to embodiments, since a length of a switch control line connecting a switch to a communication signal compensator is minimized, the possibility of error occurrence of a switch control signal is reduced.

BEST MODE

Hereinafter, embodiments disclosed in this specification will be described in detail with reference to the accompanying drawings. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Figure 1:
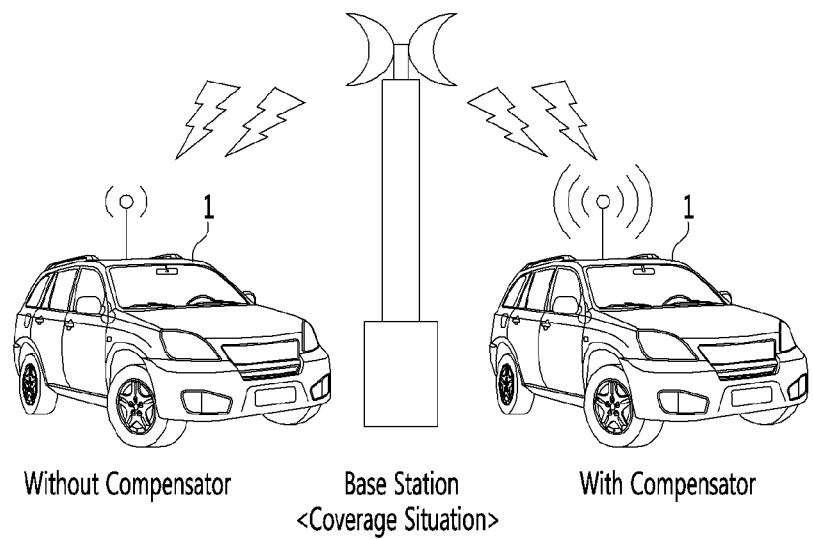
FIGS. 1 and 2 are views for describing an example in which a communication signal compensator according to an embodiment of the present invention is used.
Figure 2:
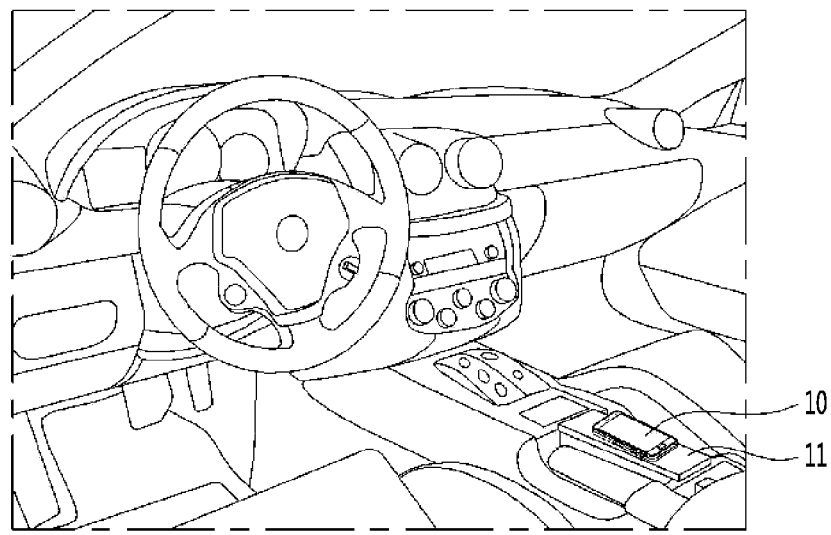

FIGS. 1 and 2 are views for describing an example in which a communication signal compensator according to an embodiment of the present invention is used.

As illustrated in FIG. 1, a communication signal compensator may be disposed inside a vehicle 1, or may amplify a communication signal transmitted and received in a communication device disposed inside the vehicle 100. Specifically, transmission/reception strength of the communication signal when the communication signal compensator is disposed inside the vehicle 1 may be higher than transmission/reception strength of the communication signal when the communication signal compensator is not disposed inside the vehicle.

Here, the communication device may include a mobile terminal such as a smart phone. Examples of the communication device may include a terminal device, a terminal, a mobile station (MS), a mobile subscriber station (MSS), a subscriber station (SS), an advanced mobile station (AMS), a wireless terminal (WT), a machine-type communication (MTC) device, a machine-to-machine (M2M) device, and a device-to-device (D2D) device. However, these are merely an example, and the communication device in the present invention may be interpreted as a concept including any devices capable of transmitting data or signals, which have been commercially developed or are to be developed in the future.

The communication signal means a signal that a communication device transmits and receives to and from another communication device. The communication signal may include an uplink signal transmitted from a communication device disposed inside the vehicle 1 to another device, and a downlink signal received from another communication device to a communication device disposed inside the vehicle 1.

In addition, the vehicle 1 illustrated in FIG. 1 is merely an example, and the communication signal compensator may be disposed at a position, such as the inside of a tall building or an elevator, in which signal transmission/reception strength is low, and amplify strength of the communication signal transmitted and received in the communication device. That is, the communication signal compensator may be installed at a place in which transmission/reception strength is low due to an obstacle.

Since a radio wave transmitted by a base station hits the building or is shielded by a metal constituting the appearance of the vehicle 1, the radio wave transmission/reception rate of the communication device disposed inside the vehicle 1 or the building may be significantly lowered. The area in which the radio wave is not partially transmitted is referred to as a shadow area, and at least one antenna may be provided in the shadow area so as to increase the radio wave transmission/reception rate.

For example, a shark antenna may be provided outside the vehicle 1, and a coupling antenna may be provided inside the vehicle 1.

If the communication signal compensator is disposed inside the vehicle 1, the communication signal compensator may be connected between the shark antenna mounted inside the vehicle 1 and the coupling antenna mounted inside the vehicle 1.

The communication signal compensator may receive and amplify an external communication signal, such as a downlink signal, from the shark antenna and transmit the signal to the communication device through the coupling antenna. In addition, the communication signal compensator may receive and amplify a signal generated in the communication signal, such as an uplink signal, from the coupling antenna and transmit the signal to a base station through the shark antenna. In this case, the communication signal compensator may serve as a bidirectional amplifier which compensates for a line loss from the shark antenna and a coupling loss between the coupling antenna and the communication device, and amplifies the uplink signal and the downlink signal at the same time.

Meanwhile, since the coupling antenna transmits and receives a signal by using an electromagnetic wave, the coupling antenna may be affected by peripheral devices. Therefore, the coupling antenna may be provided at a position which is less affected by other devices, considering a relationship with other peripheral devices. In addition, when the coupling antenna is disposed far away from the communication device, performance of the coupling antenna is deteriorated. A position which can minimize the influence of the peripheral devices while reducing the distance from the communication device may be required.

For example, the coupling antenna may be disposed in a wireless charging device provided inside the vehicle 1.

The wireless charging device is a device which supplies power to the communication device in a wireless charging method. The wireless charging method is a method of charging the communication device disposed near the wireless charging device, without connecting the wireless charging device to the communication device through a physical medium such as a cable. Therefore, when the communication device needs to be held in the wireless charging device while using the communication device, it is possible to eliminate the difficulty of inserting and removing the cable whenever used and the difficulty of using the communication device while being connected to the cable.

As illustrated in FIG. 2, in most cases, the communication device 10 inside the vehicle 1 including the wireless charging device is used in a state of being held on the wireless charging device 11. Therefore, a reception rate of an antenna signal is very important in a state in which the communication device 10 is seated on the wireless charging device 11.

When the coupling antenna is provided in the wireless charging device 11 itself, a distance between the coupling antenna and the communication device 10 is minimized. Therefore, the efficiency of the coupling antenna inside the vehicle 1 may be maximally increased. In addition, the communication device 10 may be charged through the wireless charging device 11, and at the same time, the transmission/reception strength of the signal transmitted and received to and from the communication device 10 may be increased.

Therefore, the coupling antenna according to the embodiment of the present invention may be provided inside the wireless charging device 11.

The wireless charging device used herein may mean a wireless charging device including the coupling antenna thereinside and a wireless charging device not including the coupling antenna.

Meanwhile, positions of the shark antenna, the communication signal compensator, and the wireless charging device may be various. Next, the position relationship of the shark antenna, the communication signal compensator, and the wireless charging device according to various embodiment of the present invention will be described.

Figure 3:
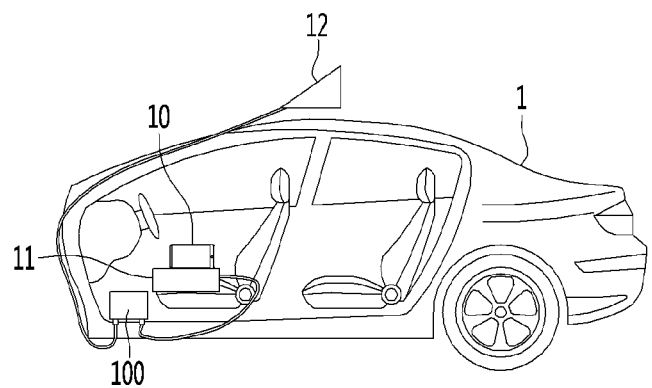
FIGS. 3 and 4 are views showing a position relationship of a shark antenna, a communication signal compensator, and a wireless charging device according to a first embodiment of the present invention.
Figure 4:
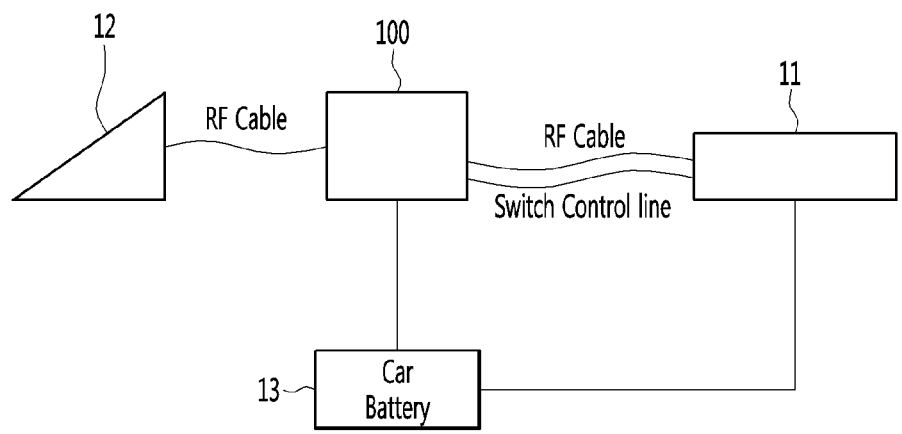

FIGS. 3 and 4 are views showing a position relationship of a shark antenna, a communication signal compensator, and a wireless charging device according to a first embodiment of the present invention.

According to a first embodiment of the present invention, the wireless charging device 11, the shark antenna 12, and the communication signal compensator 100 are separate devices.

As illustrated in FIG. 3, the shark antenna 12 may be disposed outside the vehicle 1, or the wireless charging device 11 may be disposed inside the vehicle 1. The communication signal compensator 100 may be disposed inside or outside the vehicle 1. The communication device 10 may be disposed inside the vehicle 1. In some cases, the communication device 10 may be disposed above the wireless charging device 11, but this is merely an example.

Referring to FIG. 4, the shark antenna 12 and the communication signal compensator 100 may be connected through an RF cable, and the communication signal compensator 100 and the wireless charging device 11 may be connected through an RF cable. A battery 13 provided inside the vehicle 1 may supply power to the communication signal compensator and the wireless charging device 11. A switch control line may be connected between the communication signal compensator 100 and the wireless charging device 11. The switch control line may include a plurality of switch lines and a switch control line. Details thereof will be described below with reference to FIGS. 16 and 17.

In this case, since the position of the communication signal compensator 100 is not fixed, the communication signal compensator 100 may be disposed at any position inside and outside the vehicle 1. That is, since the position of the communication signal compensator 100 is flexible, the position of the communication signal compensator 100 may be changed if necessary. For example, the communication signal compensator 100 may be disposed between the shark antenna 12 and the wireless charging device 11, and may be disposed near to the wireless charging device 11.

According to a second embodiment of the present invention, the communication signal compensator 100 and the shark antenna 12 may be configured as a single module.

Figure 5:
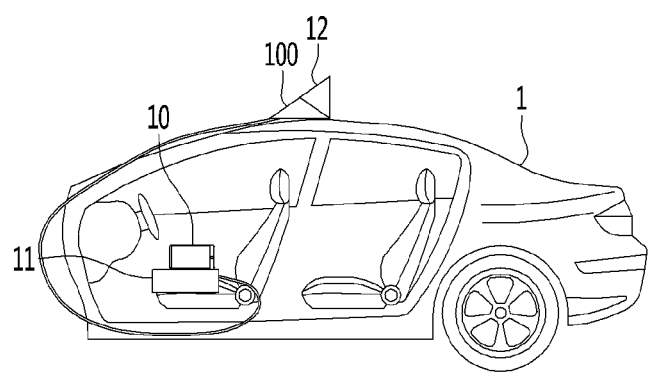
FIGS. 5 and 6 are views showing a position relationship of a shark antenna, a communication signal compensator, and a wireless charging device according to a second embodiment of the present invention.
Figure 6:
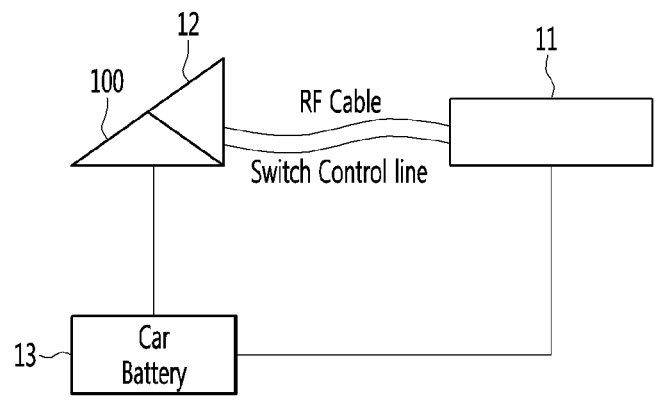

FIGS. 5 and 6 are views showing a position relationship of a shark antenna, a communication signal compensator, and a wireless charging device according to a second embodiment of the present invention.

Referring to FIG. 5, the shark antenna 12 and the communication signal compensator 100 may be configured as a single module and may be disposed outside the vehicle 1. The wireless charging device 11 and the communication device 10 may be disposed inside the vehicle 1. The communication device 10 may be disposed above the wireless charging device 11.

Referring to FIG. 6, the shark antenna 12 and the communication signal compensator 100, which are configured as a single module, may be connected to the wireless charging device 11 through an RF cable, and may be connected to a switch control line. The switch control line may include a plurality of switch lines and a switch control line. Details thereof will be described below with reference to FIGS. 16 and 17. A battery 13 provided inside the vehicle 1 may supply power to the communication signal compensator and the wireless charging device 11.

In this case, since the communication signal compensator 100 is disposed very near to the shark antenna 12, noise figure of a downlink signal may be improved.

According to a third embodiment of the present invention, the communication signal compensator 100 and the wireless charging device 11 may be configured as a single module.

Figure 7:
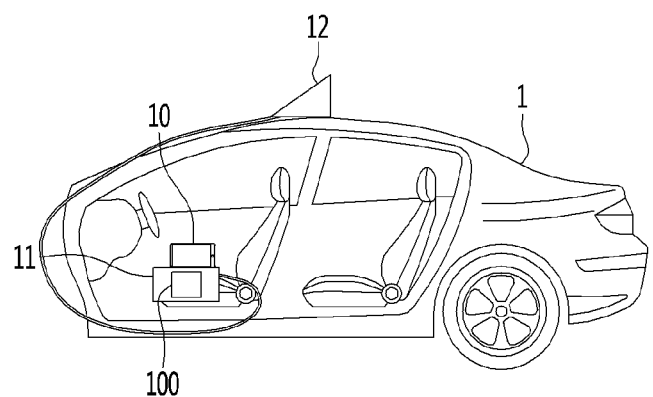
FIGS. 7 and 8 are views showing a position relationship of a shark antenna, a communication signal compensator, and a wireless charging device according to a third embodiment of the present invention.
Figure 8:
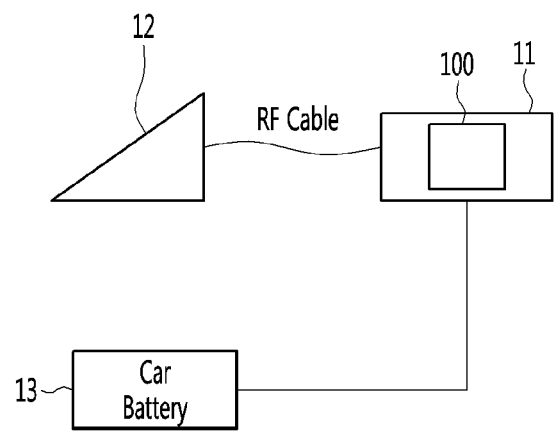

FIGS. 7 and 8 are views showing a position relationship of a shark antenna, a communication signal compensator, and a wireless charging device according to a third embodiment of the present invention.

Referring to FIG. 7, the communication signal compensator 100 and the wireless charging device 11 may be configured as a single module and may be disposed inside the vehicle 1. More specifically, the communication signal compensator 100 may be configured as a single module so as to be provided inside the wireless charging device 11. However, this is merely an example, and the present invention is not limited thereto. The shark antenna 12 may be disposed outside the vehicle 1. The communication device 10 may be disposed inside the vehicle 1. In some cases, the communication device 10 may be disposed above the wireless charging device 11 inside the vehicle 1.

Referring to FIG. 8, the shark antenna 12 may be connected to the communication signal compensator 100 and the wireless charging device 11, which are configured as a single module, through an RF cable. A battery 13 provided inside the vehicle 1 may supply power to the communication signal compensator and the wireless charging device 11.

In this case, since the communication signal compensator 100 and the wireless charging device 11 are configured as a single module, the cable for connecting the communication signal compensator 100 and the wireless charging device 11 may be omitted, or the length of the cable may be shortened. In addition, the length of the switch control line connected between the communication signal compensator 100 and the wireless charging device 11 may be shortened. Therefore, the number or length of cables connecting the respective devices is significantly reduced, and thus the installation thereof is facilitated and the manufacturing cost is reduced.

Next, the communication signal compensator and the coupling antenna will be described in detail.

Figure 9:
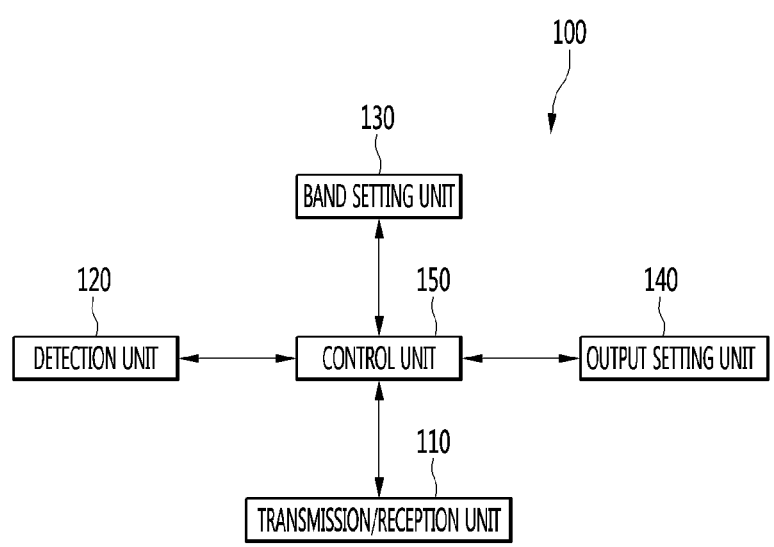
FIG. 9 is a block diagram illustrating a configuration of a communication signal compensator according to an embodiment of the present invention.
Figure 10:
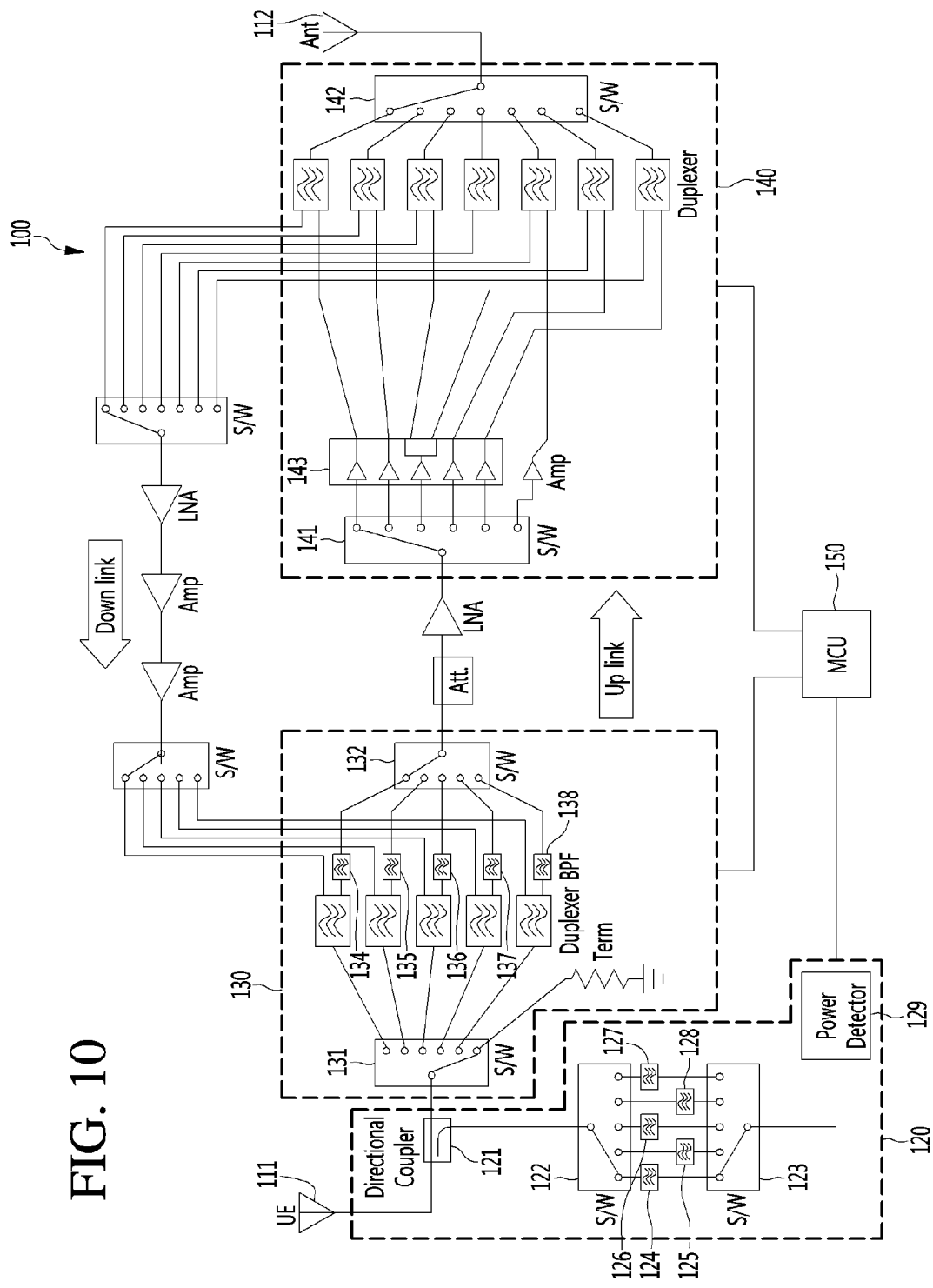
FIG. 10 is a circuit block diagram of a communication signal compensator according to an embodiment of the present invention.

First, the communication signal compensator will be described with reference to FIGS. 9 and 10. FIG. 9 is a block diagram for describing the configuration of the communication signal compensator according to an embodiment of the present invention, and FIG. 10 is a circuit diagram of the communication signal compensator according to an embodiment of the present invention.

Referring to FIG. 9, the communication signal compensator 100 may include: a transmission/reception unit that transmit and receive a communication signal; a detection unit 120 that detects a power level of the communication signal received from the transmission/reception unit 110; a band setting unit 130 that sets a communication frequency band; an output setting unit 140 that sets a communication output band; and a control unit 150 that controls the operation of the communication signal compensator 100.

The transmission/reception unit 110 may include an uplink signal antenna 111 that receives an uplink signal generated in the communication device, and a downlink signal antenna 112 that receives a downlink signal transmitted to the communication device.

The detection unit 120 may include a coupler 121, a first switch 122, a second switch 123, a first band pass filter 124, a second band pass filter 125, a third band pass filter 126, a fourth band pass filter 127, a fifth band pass filter 128, and a power detector 129.

The detection unit 120 may transmit the communication signal, which is received through the uplink signal antenna 111, to the power detector 129 through the coupler 121. Specifically, the first switch 122 and the second switch 123 may be connected to one of the first to fifth band pass filters 124 to 128 at predetermined intervals. The power detector 129 may receive the communication signal passing through the fifth to fifth band pass filters 124 to 128 and determine whether the power level exceeds a preset power level. As the detection result of the power detector 129, when the communication signal exceeding the preset power level is detected, the control unit 150 may detect that the uplink signal is received.

The first switch 122 and the second switch 123 may be connected to one of the first to fifth band pass filters 124 to 128 at predetermined intervals, and the power detector 129 may receive the communication signal passing through each of the first to fifth band pass filters 124 to 128 and measure the power level thereof. The control unit 150 may determine the band corresponding to the highest power level among the measured power levels as the frequency band of the communication signal. This is done for accurately determining the frequency band corresponding to the received uplink signal. For example, the uplink signal antenna 111 may receive an uplink signal having the fifth frequency band and having a very high power level. In this case, when the signal passes through one of the first to fourth band pass filters due to the very high power level, the power level may be higher than the preset power level, and thus the frequency band of the received uplink signal may be erroneously determined as one of the first to fourth bands. Therefore, the frequency band of the uplink signal may be accurately determined by acquiring the band pass filter when the power level is highest after detecting that the uplink signal has been received.

The band setting unit 130 may set the communication frequency band to the determined frequency band of the communication signal. The band setting unit 130 may include a third switch 131, a fourth switch 132, a first band pass filter 134, a second band pass filter 135, a third band pass filter 136, a fourth band pass filter 137, and a fifth band pass filter 138. The control unit 150 may perform control such that the third switch 131 and the fourth switch 132 are connected to the band pass filter corresponding to the frequency band of the communication signal determined by the detection unit 120.

The uplink signal passing through one of the first to fifth band pass filters 134 to 138 through the third switch 131 and the fourth switch 132 may pass through an attenuator and be transmitted to the output setting unit 140 through a low-noise amplifier (LNA).

The control unit 150 may analyze the communication frequency signal and the waveform of the communication signal and determine the output band of the communication signal. The output setting unit 140 may perform control such that the communication output band is set to the determined output band of the communication signal.

The output setting unit 140 may include a fifth switch 141, a sixth switch 142, and an amplifier module 143. The control unit 150 may control the fifth switch 141 and the sixth switch 142 such that the output setting unit sets the communication output band to the determined output band of the communication signal. The output band may include Band 1, Band 3, Band 7, Band 8, Band 20, GSM900, and GSM1800, but these are merely an example.

The control unit 150 may perform control such that the frequency band of the communication signal and the signal waveform are analyzed and signals are transmitted through output bands distinguished from each other. When the fifth switch 141 and the sixth switch 142 are connected according to the determined output band, the communication signal may pass through a duplexer and be transmitted through the downlink signal antenna 112.

Figure 11:
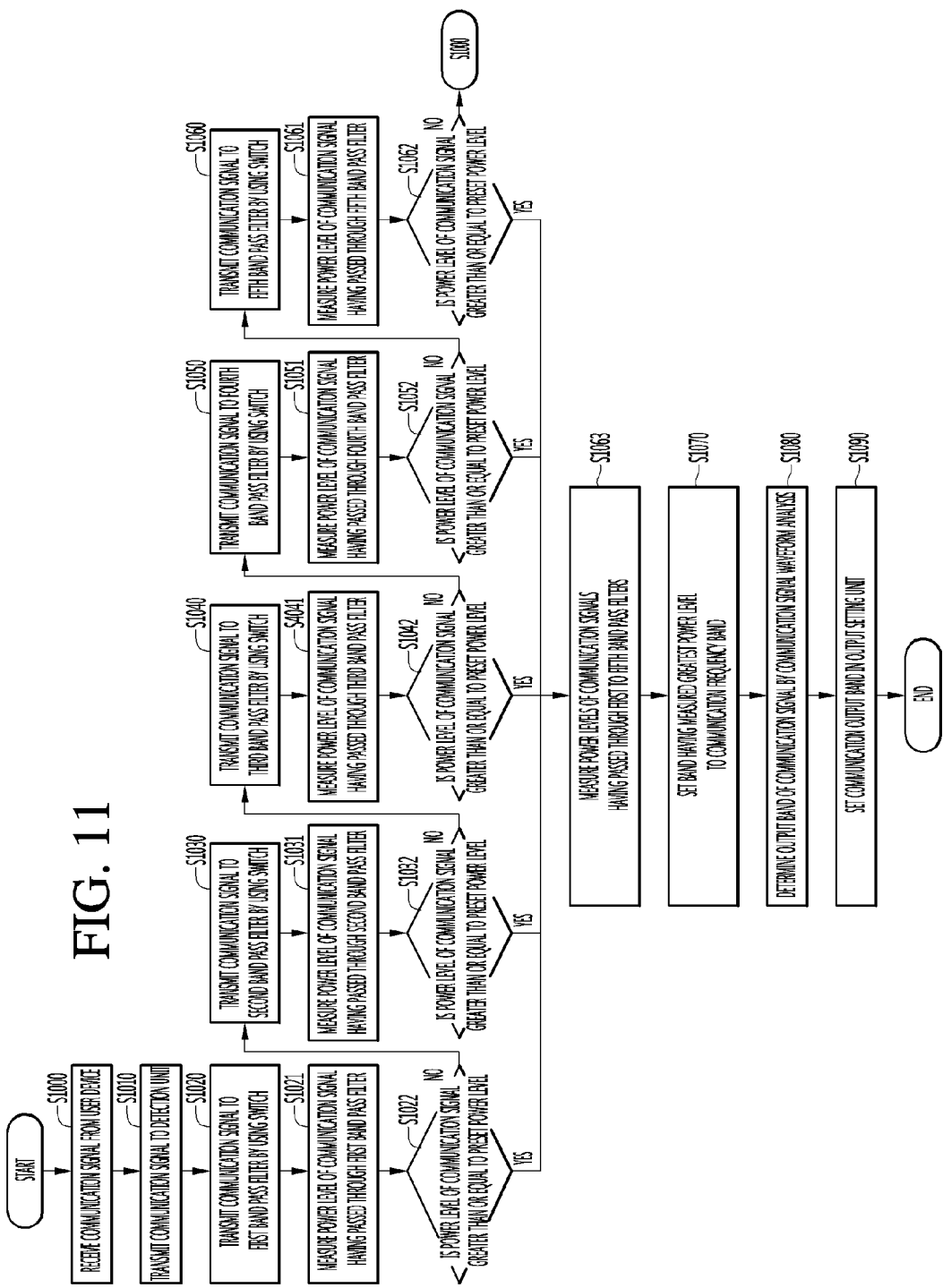
FIG. 11 is a flowchart of an operating method of a communication compensator according to an embodiment of the present invention.

FIG. 11 is a flowchart of an operating method of a communication compensator according to an embodiment of the present invention.

The communication signal compensator may receive a communication signal from the communication device through the uplink signal antenna (S1000).

The communication signal may include an uplink signal, a noise signal, and the like. When the received communication signal is the uplink signal, the communication signal compensator may amplify the uplink signal. On the other hand, when the received communication signal is the noise signal or the like, the communication signal compensator need not amplify the noise signal. Therefore, the communication signal compensator may determine whether the received communication signal is the uplink signal.

The communication signal compensator transmits the received communication signal to the detection unit (S1010), transmits the communication signal to the first band pass filter by using the switch (S1020), measures the power level of the signal having passed through the first band pass filter (S1021), determines whether the power level of the signal having passed through the first band pass filter is greater than or equal to a preset power level (S1022), measures the power level of the signal having passed through each of the first to fifth band pass filters when it is determined that the power level of the signal is greater than or equal to the preset power level (S1063), and transmits the communication signal to the second band pass filter by using the switch when it is determined that the power level of the signal is less than the preset power level (S1030). The communication signal compensator measures the power level of the signal having passed through the second band pass filter (S1031), determines whether the power level of the signal having passed through the second band pass filter is greater than or equal to the preset power level (S1032), measures the power level of the signal having passed through each of the first to fifth band pass filters when it is determined that the power level of the signal is greater than or equal to the preset power level (S1063), and transmits the communication signal to the third band pass filter by using the switch when it is determined that the power level of the signal is less than the preset power level (S1040). The communication signal compensator measures the power level of the signal having passed through the third band pass filter (S1041), determines whether the power level of the signal having passed through the third band pass filter is greater than or equal to the preset power level (S1042), measures the power level of the signal having passed through each of the first to fifth band pass filters when it is determined that the power level of the signal is greater than or equal to the preset power level (S1063), and transmits the communication signal to the fourth band pass filter by using the switch when it is determined that the power level of the signal is less than the preset power level (S1050). The communication signal compensator measures the power level of the signal having passed through the fourth band pass filter (S1051), determines whether the power level of the signal having passed through the fourth band pass filter is greater than or equal to the preset power level (S1032), measures the power level of the signal having passed through each of the first to fifth band pass filters when it is determined that the power level of the signal is greater than or equal to the preset power level (S1063), and transmits the communication signal to the fifth band pass filter by using the switch when it is determined that the power level of the signal is less than the preset power level (S1060). The communication signal compensator measures the power level of the signal having passed through the fifth band pass filter (S1061), determines whether the power level of the signal having passed through the fifth band pass filter is greater than or equal to the preset power level (S1062), measures the power level of the signal having passed through each of the first to fifth band pass filters when it is determined that the power level of the signal is greater than or equal to the preset power level (S1063), and receives the communication signal from the communication device when it is determined that the power level of the signal is less than the preset power level (S1000).

That is, when the power level of the communication signal having passed through the first to fifth band pass filters is less than the preset power level, the communication signal compensator may determine that the communication signal received from the communication device is not the uplink signal. On the other hand, when one of the power levels of the communication signals having passed through the first to fifth band pass filters is greater than or equal to the preset power level, the communication signal compensator may determine that the received communication signal is the uplink signal.

When the communication signal compensator determines that the uplink signal is received, the communication signal compensator may measure the power levels of the signals having passed through the first to fifth band pass filters (S1063), and may set the band having the greatest power level to the communication frequency band (S1070).

In this manner, it is possible to accurately determine the frequency band of the received uplink signal.

The output band of the communication signal may be determined through the communication signal waveform analysis (S1080), and the output setting unit may set the communication output band (S1090).

Since the communication signal compensator according to the embodiment of the present invention may not include the band pass filter, the power detector, the amplifier, and the like for each frequency band, the structure may be simplified, and the manufacturing cost may be reduced.

Next, the coupling antenna according to the embodiment of the present invention will be described with reference to FIGS. 12 and 13.

The coupling antenna described below may receive the uplink signal generated in the communication device and transmit the uplink signal to the communication signal compensator 100. In the communication signal compensator 100, only elements required for describing the coupling antenna are illustrated in FIGS. 12 and 13, and the communication signal compensator may further include elements other than the elements illustrated in FIGS. 12 and 13.

Figure 12:
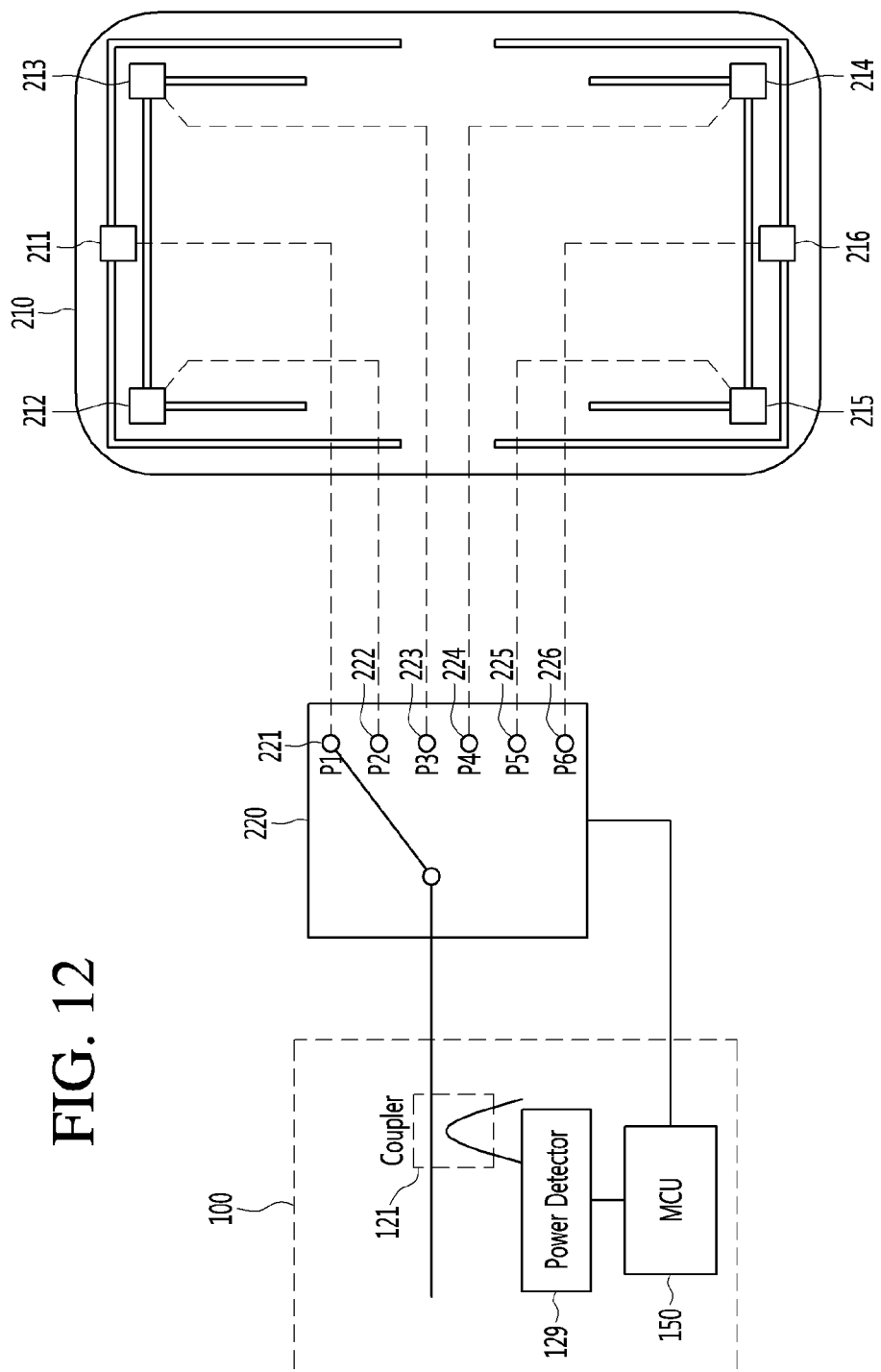
FIG. 12 is a view for describing a coupling antenna according to a first embodiment of the present invention.
Figure 13:
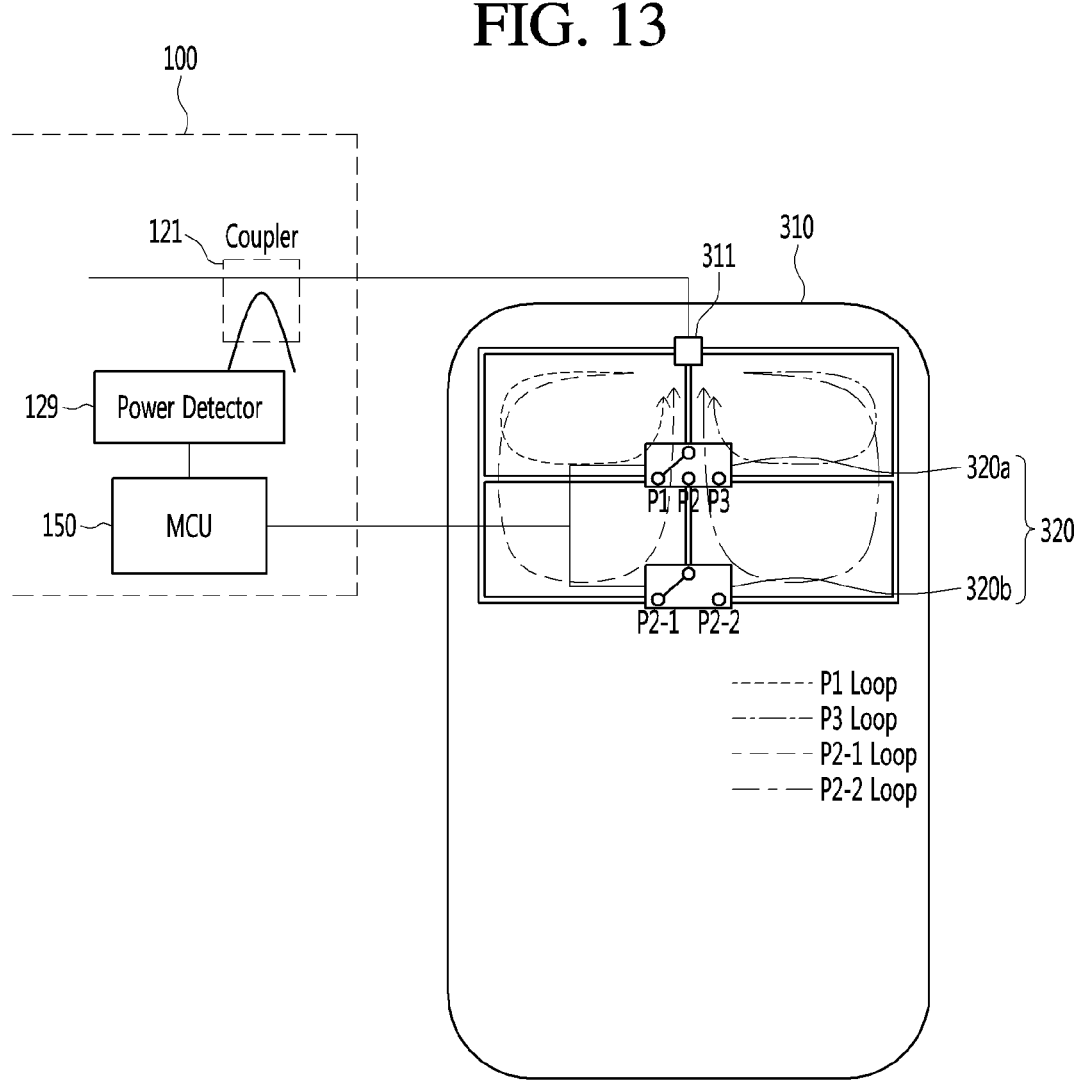
FIG. 13 is a view for describing a coupling antenna according to a second embodiment of the present invention.

FIG. 12 is a view for describing a coupling antenna according to a first embodiment of the present invention, and FIG. 13 is a view for describing a coupling antenna according to a second embodiment of the present invention.

The coupling antenna 200 according to the first embodiment of the present invention may include an antenna PCB 210 and a switch 220.

The antenna PCB 210 may include a plurality of antennas. Specifically, the antenna PCB 210 may include a first antenna 211, a second antenna 212, a third antenna 213, a fourth antenna 214, a fifth antenna 215, and a sixth antenna 216.

The positions of the first to sixth antennas 211 to 216 may be different from each other. For example, the first to third antennas 211 to 213 may be disposed on a first side of the antenna PCB 210, and the fourth to sixth antennas 214 to 216 may be disposed on a second side of the antenna PCB 210. The first antenna 211 on the first side may be disposed between the second antenna 212 and the third antenna 213, and the sixth antenna 216 on the second side may be disposed between the fourth antenna 214 and the fifth antenna 215. As such, when the plurality of antennas are disposed around both sides of the coupling antenna 200, a communication signal may be efficiently received from a communication device in which an antenna is mainly disposed on the side end.

The types of the first to sixth antennas 211 to 216 may be different from each other. For example, the first and sixth antennas 211 and 216 may be a low frequency antenna of less than 1 GHz, and the second to fifth antennas 212 to 215 may be a high frequency antenna of 1 GHz or more.

However, these are merely an example, and there is no limitation in the positions, the types, and the number of the first to sixth antennas 211 to 216. However, the coupling antenna 200 illustrated in FIG. 12 will be described as an example for convenience of explanation.

One of the first to sixth antennas 211 to 216 may be connected to the communication signal compensator by the switch 220. The switch 220 may be an RF switch. The switch 220 may include first to sixth ports 221 to 226 respectively corresponding to the first to sixth antennas 211 to 216. The switch 220 may connect the communication signal compensator 100 to one of the first to sixth ports 221 to 226 so as to receive the communication signal from the first to sixth antennas 211 to 216.

The communication signal received through one of the first to sixth antennas 211 to 216 may be transmitted to the communication signal compensator 100. Specifically, when the switch 220 is connected to the first port 221, the communication signal received through the first antenna 211 may be transmitted to the communication signal compensator 100. When the switch 220 is connected to the second port 222, the communication signal received through the second antenna 212 may be transmitted to the communication signal compensator 100. When the switch 220 is connected to the third port 223, the communication signal received through the third antenna 213 may be transmitted to the communication signal compensator 100. When the switch 220 is connected to the fourth port 224, the communication signal received through the fourth antenna 214 may be transmitted to the communication signal compensator 100. When the switch 220 is connected to the fifth port 225, the communication signal received through the fifth antenna 215 may be transmitted to the communication signal compensator 100. When the switch 220 is connected to the sixth port 226, the communication signal received through the sixth antenna 216 may be transmitted to the communication signal compensator 100.

Therefore, the control unit 150 may control the coupling antenna 200 such that the antenna receiving the greatest signal magnitude among the first to sixth antennas 211 to 216 is selected and the signal is transmitted to the communication signal compensator 100.

The coupler 121 of the communication signal compensator 100 may transmit the communication signal received from the coupling antenna 200 to the power detector 129. The power detector 129 may directly detect the magnitudes of the communication signals received through the first to sixth antennas 211 to 216. The control unit 150 may control the switch 220 to be connected to the antenna having transmitted the communication signal having the detected greatest magnitude.

The magnitude of the uplink signal detected by the coupling antenna may be changed according to the position relationship between the communication device and the coupling antenna. The coupling antenna 200 according to the present invention may include a plurality of antennas. The magnitude of the uplink signal received through each antenna is detected, and the uplink signal is received through the antenna having the greatest signal magnitude. Therefore, it is possible to obtain an effect similar to the movement of the antenna to the position at which the uplink signal is optimally received according to the position of the communication device. That is, it is possible to minimize the reception rate of the uplink signal from being lowered according to the position of the communication device.

The coupling antenna 300 according to the second embodiment of the present invention may include an antenna PCB 310 and a switch 320. The switch 320 may be an RF switch.

The antenna PCB 310 may include a pattern antenna 311. The reception range and reception direction of the pattern antenna 311 may be changed according to the connection state of the switch 320. For example, when the first switch 320a is connected to the first port, the pattern antenna may be formed by P1 loop. When the first switch 320a is connected to the second port and the second switch 320b is connected to the (2-1)th port, the pattern antenna may be formed by P2-1 loop. When the first switch 320a is connected to the second port and the second switch 320b is connected to the (2-2)th port, the pattern antenna may be formed by P2-2 loop. When the first switch 320a is connected to the third port, the pattern antenna may be formed by P3 loop.

In this case, an example in which the switch 320 includes the two switches 320a and 320b has been described, but the number of switches is not limited. As the number of switches increases, the type of formable pattern antennas may increase. In addition, the loop forming the pattern antenna illustrated in FIG. 13 is merely an example, and the present invention is not limited thereto.

The reception strength of the uplink signal may be changed according to the formed pattern antenna. The coupler 121 of the communication signal compensator 100 may transmit the uplink signal received through the pattern antenna 311, and the power detector 129 may detect the magnitude of the uplink signal. The control unit 150 may control the switch 320 such that the magnitude of the uplink signal is compared to form the pattern antenna 311 to which the uplink signal having the greatest magnitude has been transmitted.

Therefore, the coupling antenna 300 according to the second embodiment of the present invention forms the optimal pattern antenna according to the position of the communication device and maximize the reception strength of the uplink signal according to the position of the communication device. In addition, according to the second embodiment of the present invention, various types of pattern antennas may be formed by using a small number of elements.

Figure 14:
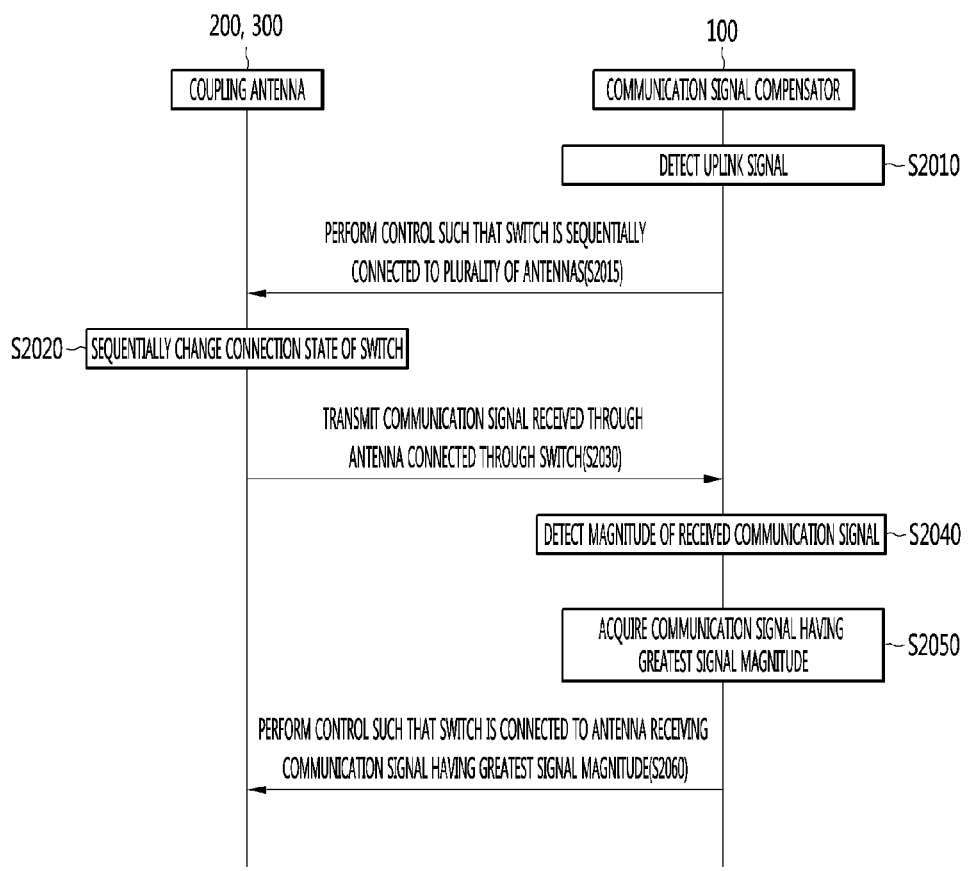
FIG. 14 is a flowchart of a method by which a communication compensator receives a communication signal through a coupling antenna, according to an embodiment of the present invention.

Next, FIG. 14 is a flowchart of a method by which a communication compensator receives a communication signal through a coupling antenna, according to an embodiment of the present invention. The coupling antenna may mean coupling antennas 200 and 300 that receive communication signals by selecting the optimal antenna described with reference to FIGS. 11 and 12.

The communication signal compensator 100 may detect the uplink signal (S2010).

The control unit 150 may perform control such that the switches 220 and 320 are sequentially connected to a plurality of antennas and detect whether the uplink signal is received. Specifically, the power detector 129 may detect the magnitude of the communication signal received through each of the plurality of antennas, and the control unit 150 may detect that the uplink signal is received when the communication signal of greater than or equal to a preset reference magnitude is detected.

When the uplink signal is detected, the control unit 150 of the communication signal compensator 100 may perform control such that the switch are sequentially connected to each of the plurality of antennas (S2015).

When the uplink signal is detected, the coupling antennas 200 and 300 may sequentially change the connection states of the switches 220 and 320 (S2020).

The switch 220 of the coupling antenna 200 according to the first embodiment may be connected to the second port 222 when a preset period elapses in a state of being connected to the first port 221, may be connected to the third port 223 when a preset period elapses in a state of being connected to the second port 222, may be connected to the fourth port 224 when a preset period elapses in a state of being connected to the third port 223, may be connected to the fifth port 225 when a preset period elapses in a state of being connected to the fourth port 224, and may be connected to the sixth port 226 when a preset period elapses in a state of being connected to the fifth port 225.

In the switch 320 of the coupling antenna 200 according to the second embodiment, the first switch 320a may be connected to the second port when a preset period elapses when the first switch 320a is connected to the first port and the second switch 320b is connected to the (2-1)th port. The second switch 320b may be connected to the (2-2)th port when the preset period elapses in a state in which the first switch 320a is connected to the second port and the second switch 320b is connected to the (2-1)th port. The first switch 320a may be connected to the third port when the preset period elapses in a state in which the first switch 320a is connected to the second port and the second switch 320b is connected to the (2-2)th port.

As such, the coupling antennas 200 and 300 may change the connection states of the switches 220 and 320. The coupling antennas 200 and 300 may change the connection states of the switches 220 and 320 at preset intervals.

The coupling antennas 200 and 300 may transmit, to the communication signal compensator 100, the communication signal received through the antenna connected through the switches 220 and 320.

The coupling antennas 200 and 300 may receive the communication signals through the antennas connected to the switches 220 and 320 whenever the connection states of the switches 220 and 320 are changed, and transmit the received communication signals to the communication signal compensator 100.

The power detector 129 of the communication signal compensator 100 may detect the magnitude of the received communication signal (S2040).

The power detector 129 may detect the magnitudes of the communication signals corresponding to the connection states of the switches 220 and 320.

The control unit 150 may acquire the communication signal having the greatest signal magnitude (S2050).

The control unit 150 may detect the magnitudes of the communication signals corresponding to the connection states of the switches 220 and 320 and compare the detected magnitudes of the communication signals. The control unit 150 may acquire the communication signal having the greatest signal magnitude as the comparison result.

The control unit 150 may perform control such that the switches 220 and 320 are connected to the antenna receiving the communication signal having the greatest signal magnitude (S2060).

The coupling antennas 200 and 300 may connect the switches 220 and 320 to the antenna receiving the signal having the greatest signal magnitude and transmit the signal to the communication signal compensator 100.

As such, the coupling antennas 200 and 300 according to the embodiment of the present invention may receive the signals having the greatest magnitude corresponding to the communication signals received at various positions and in various direction by using the one antenna PCB 210 or 310 and the switch 220 or 320.

Meanwhile, the communication signal compensator and the coupling antenna described above may be provided in a wireless charging device.

The communication device may be disposed near to the wireless charging device including the communication signal compensator and the coupling antenna therein. In this case, the communication device may receive power through the wireless charging device and increase the transmission/reception strength of the communication signal through the communication signal compensator and the coupling antenna.

Figure 15:
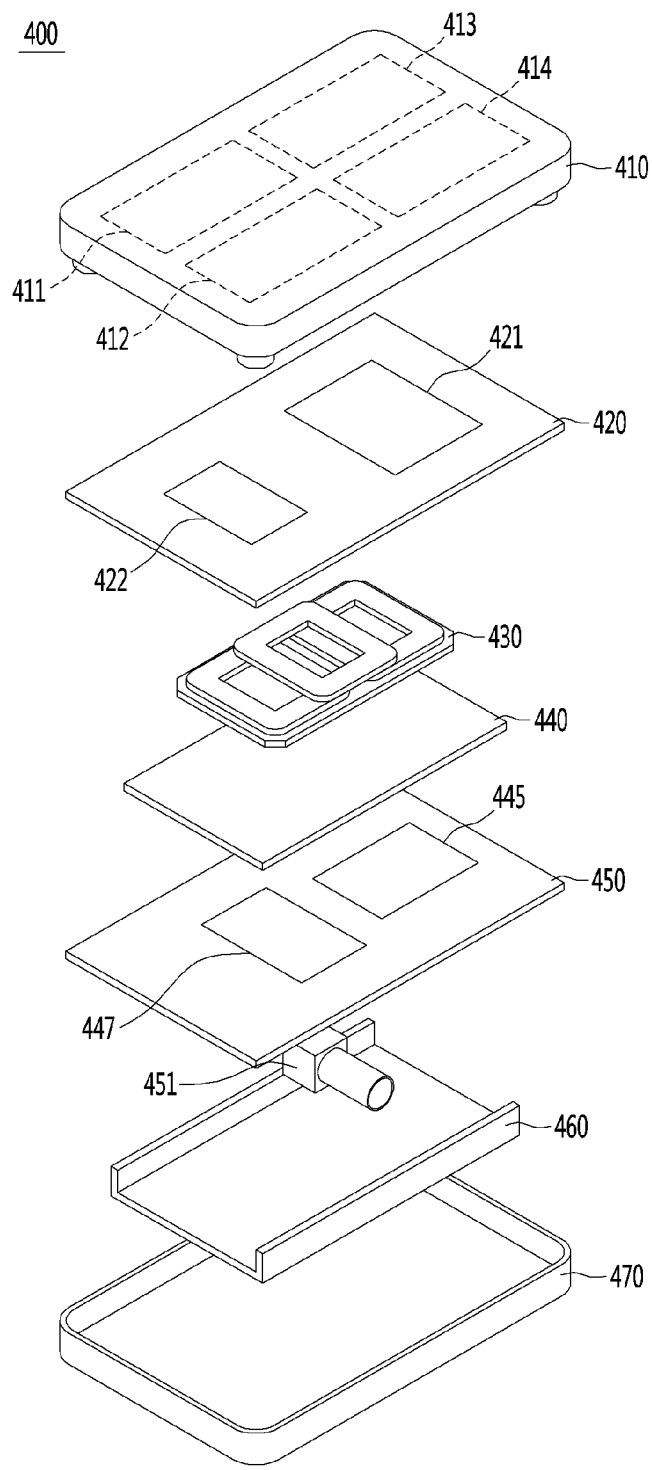
FIG. 15 is an exploded perspective view of a wireless charging device including a communication signal compensator and a coupling antenna, according to an embodiment of the present invention.

FIG. 15 is an exploded perspective view of a wireless charging device including a communication signal compensator and a coupling antenna, according to an embodiment of the present invention.

The wireless charging device 400 may include a top cover 410 and a bottom cover 470 for protecting a wireless charging unit, a communication signal compensator, and a coupling antenna. The top cover 410 and the bottom cover 470 may be attachable or detachable. When the top cover 410 and the bottom cover are coupled, the internal space may be formed, and at least one of the wireless charging unit, the communication signal compensator, and the coupling antenna may be accommodated in the space.

The communication device may be disposed on the top cover 410. When the communication device is disposed on the top cover 410, the communication device may receive power through a wireless charging coil, and the communication signal transmitted and received in the communication device may be amplified by the communication signal compensator and the antenna.

The wireless charging unit may include a wireless charging coil 430, a wireless charging coil bracket 440, and a wireless charging PCB 445.

The wireless charging coil 430 may charge the communication device by using a magnetic induction method or a magnetic resonance method. According to the magnetic induction method, the wireless charging coil 430 may generate a magnetic field, an induction current may flow through the reception coil of the communication device, and the communication device may be charged according to the flow of the induction current. According to the magnetic resonance method, the wireless charging coil 430 may generate a magnetic field vibrating at the same resonance frequency as the reception coil of the communication device, and the reception coil of the communication device may receive energy caused by the magnetic field and be charged.

The wireless charging coil bracket 440 may support the wireless charging coil 430 and discharge heat generated by the wireless charging coil 430. The wireless charging coil bracket 440 may be disposed below the wireless charging coil 430.

The wireless charging PCB 445 may be disposed below the wireless charging coil bracket 440.

The wireless charging PCB 445 may be disposed on a lower substrate 450 and control the wireless charging coil 430.

In addition, the communication signal compensator 447 may be disposed on the lower substrate 450 together with the wireless charging PCB 445.

The communication signal compensator 447 may amplify the uplink signal and the downlink signal transmitted and received in the communication device. Since details thereof are the same as described above, the detailed description thereof will be omitted.

The communication signal compensator 447 and the wireless charging PCB 445 are disposed on the same lower substrate 450, and may amplify the signals transmitted and received in the communication device and simultaneously charge the communication device.

A Fakra connector 451 may be connected to one region of the lower substrate 450.

A lower substrate bracket 460 may be disposed below the lower substrate 450. The lower substrate bracket 460 may support the communication signal compensator 447 and the wireless charging PCB 445 and may discharge heat generated by the communication signal compensator 447 and the wireless charging PCB 445.

In addition, the lower substrate bracket 460 may shield electromagnetic interference (EMI). For example, the lower substrate bracket 460 may shield electromagnetic interference generated by the communication signal compensator 447 and the wireless charging PCB 445.

The coupling antenna 420 may be accommodated in the wireless charging device 400. The coupling antenna 420 may include an antenna PCB 421 and a switch 422. The antenna PCB 421 may be disposed on the upper substrate 420, and the switch 422 may be disposed on the upper substrate 420 or the lower substrate 450.

The antenna PCB 421 may be disposed on the upper substrate 420 disposed between the top cover 410 and the wireless charging coil 430. In this case, since the antenna PCB 421 is disposed nearest to the communication device disposed on the top surface of the top cover 410, it is possible to minimize the loss when the uplink signal generated in the communication device is received.

In addition, at least the wireless charging coil 430 is disposed between the antenna PCB 421 and the communication signal compensator 447. That is, the antenna PCB 421 may not be directly disposed on the top surface of the communication signal compensator 447. Therefore, it is possible to minimize the inherent characteristics of the communication signal compensator 447 from being lowered by the antenna PCB 421.

The communication device may be variously disposed on the top surface of the top cover 410. Specifically, since the user can arbitrarily place the communication device on the wireless charging device 400, the communication device may be variously disposed in a region adjacent to the top cover 410. For example, one surface of the communication device is placed in contact with the top surface of the top cover 410, is placed oppositely, is placed oppositely in a horizontal direction, or is placed oppositely in a vertical direction.

Meanwhile, the antenna provided inside the communication device may be disposed in a partial region of the communication device. Therefore, when the communication device is arbitrarily disposed on the top cover 410, the antenna provided in the communication device may also be disposed in an arbitrary region. In addition, since the position of the antenna is different according to the type of the communication device, the antenna provided in the communication device may be disposed in an arbitrary region. For example, the antenna provided in the communication device may be disposed in any of first to fourth regions 414. The first to fourth regions 411, 412, 413, and 414 are merely an example for describing that the antenna provided in the communication device can be disposed in an arbitrary region, and are not limited thereto.

The coupling antenna 410 may detect the magnitude of the uplink signal generated in the communication device while changing the connection state of the switch 422 according to the position of the antenna provided in the communication device. The coupling antenna 420 may control the switch 422 such that the antenna receiving the uplink signal generated in the communication device at the maximum signal strength is connected to the communication signal compensator 447.

The antenna PCB 421 including a plurality of antennas or a plurality of pattern antennas may be disposed on the upper substrate 420. The switch 422, which connects one of the plurality of antennas to the communication signal compensator 447 or connects one of the plurality of pattern antennas to the communication signal compensator 447, may be disposed on the upper substrate 420 or the lower substrate 450.

Figure 16:
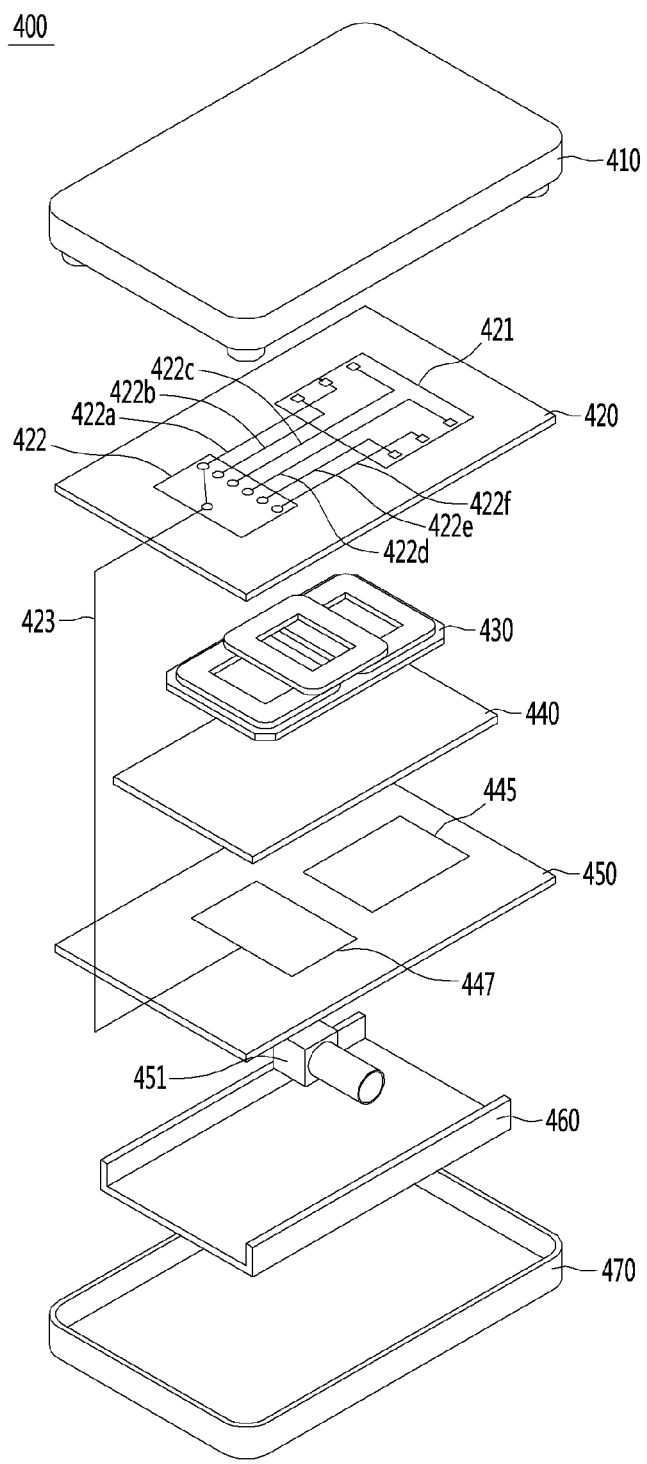
FIG. 16 is a view showing an arrangement state of signal lines when a switch according to a first embodiment of the present invention is disposed on an upper substrate.

Next, FIG. 16 is a view showing an arrangement state of signal lines when a switch according to a first embodiment of the present invention is disposed on an upper substrate.

The wireless charging device 400 may include a plurality of switch lines 422a to 422f and a switch control line 423. More specifically, the plurality of switch lines 422a to 422f may be included in the switch 422.

The plurality of switch lines 422a to 422f may be cables for connecting a plurality of antennas included in the antenna PCB 421 to a plurality of ports included in the switch 422. The switch control line 423 may be a cable for connecting the switch 422 to the communication signal compensator 447, and may be a cable for transmitting a switch control signal from the communication signal compensator to the switch 422. In this case, the switch control signal is a signal for controlling the connection state of the switch 422 according to the magnitudes of the communication signals received through the plurality of antennas, and may be a signal for transmitting the signal from the communication signal compensator 447 to the switch 422.

Referring to FIG. 16, when the switch 422 is disposed on the upper substrate 420, the plurality of switch lines 422a to 422f may be disposed on the upper substrate 420. Only one switch control line 423 may be disposed across the upper substrate 420 and the lower substrate 450. A length of each of the plurality of switch lines 422a to 422f may be shorter than a length of the switch control line 423.

Therefore, according to the first embodiment of the present invention, since the length of the plurality of switch lines 422a to 422f is short, the manufacturing cost may be reduced. Since the plurality of switch lines 422a to 422f are disposed on the upper substrate 420, the structure may be simplified, and there is an advantage that the risk of tangling or breaking of the cables is reduced.

Figure 17:
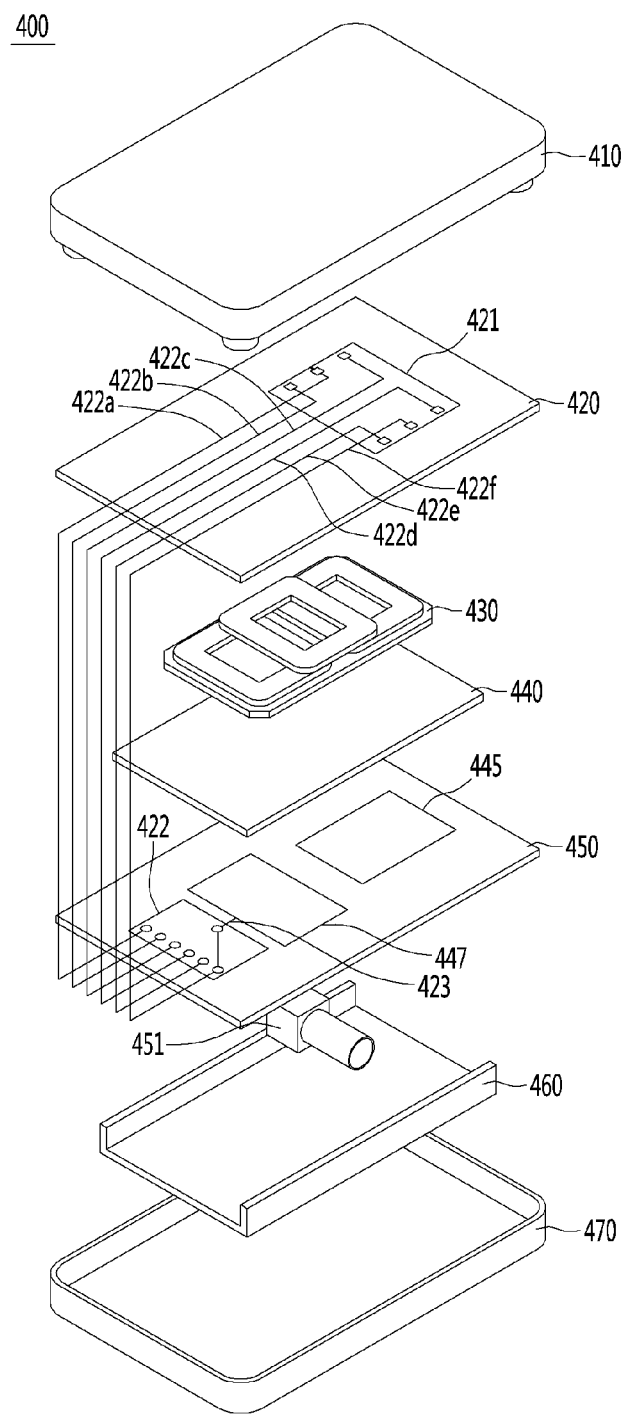
FIG. 17 is a view showing an arrangement state of signal lines when a switch according to a second embodiment of the present invention is disposed on a lower substrate.

FIG. 17 is a view showing an arrangement state of signal lines when a switch according to a second embodiment of the present invention is disposed on a lower substrate.

Referring to FIG. 17, when the switch 423 is disposed on the lower substrate 450, the plurality of switch lines 422a to 422f may be disposed across the upper substrate 420 and the lower substrate 450. The switch control line 423 may be disposed on the lower substrate 450. A length of the switch control line 423 may be shorter than a length of each of the plurality of switch lines 422a to 422f.

Therefore, according to the second embodiment of the present invention, since the length of the switch control line 423 is short and stably arranged on the substrate, there is an advantage that the possibility of error occurrence of the switch control signal transmitted from the communication signal compensator 447 is reduced.

The description above is merely illustrative of the technical idea of the present invention, and various changes and modifications may be made by those skilled in the art without departing from the essential characteristics of the present invention.

Therefore, the embodiments disclosed in the present invention are intended to illustrate rather than limit the scope of the present invention, and the scope of the technical idea of the present invention is not limited by these embodiments.

The scope of protection of the present invention should be construed according to the following claims, and all technical ideas within the scope of equivalents should be construed as being included in the scope of the present invention.

The invention claimed is:

1. A wireless charging device comprising:
a plurality of antennas configured to receive a communication signal from a communication device;
a communication signal compensator configured to amplify the communication signal received through one of the plurality of antennas;
a wireless charging coil configured to transmit wireless power to the communication device; and
a switch coupled to each of the plurality of antennas and configured to couple the one of the plurality of antennas to the communication signal compensator,
wherein the switch, a plurality of switch lines, and the plurality of antennas are disposed on a same substrate, and
wherein the wireless charging coil is disposed between the plurality of antennas and the communication signal compensator.

2. The wireless charging device according to claim 1, further comprising a switch control line configured to transmit a switch control signal for controlling the switch to be coupled to the one of the plurality of antennas.

3. The wireless charging device according to claim 2, wherein the switch control line coupling the switch to the communication signal compensator passes between the substrate and the communication signal compensator.

4. The wireless charging device according to claim 3, wherein a length of each of the plurality of switch lines is shorter than a length of the switch control line.

5. The wireless charging device according to claim 1, further comprising a cover in which the communication device is capable of being disposed,
wherein the substrate is disposed below the cover.

6. A wireless communication device comprising:
an upper substrate comprising a plurality of antennas configured to receive a communication signal from a communication device;
a lower substrate comprising a communication signal compensator configured to amplify the communication signal received through one of the plurality of antennas;
a wireless charging coil configured to transmit wireless power to the communication device;
a switch comprising a plurality of switch lines coupled to each of the plurality of antennas and configured to couple the one of the plurality of antennas to the communication signal compensator; and
a switch control line configured to:
transmit a switch control signal for controlling the switch to be coupled to the one of the plurality of antennas; and
couple the switch to the communication signal compensator,
wherein the switch and the switch control line are disposed on the lower substrate, and the plurality of switch lines couple the upper substrate to the lower substrate.

7. The wireless charging device according to claim 6, wherein a length of each of the plurality of switch lines is longer than a length of the switch control line.

* * * * *